May 16, 1944.  C. M. EASON  2,348,891
CLUTCH CONTROL MECHANISM
Filed Jan. 15, 1942   6 Sheets-Sheet 1

Inventor:
Clarence M. Eason
By:
Attys

May 16, 1944.   C. M. EASON   2,348,891
CLUTCH CONTROL MECHANISM
Filed Jan. 15, 1942   6 Sheets-Sheet 3

Inventor:
Clarence M. Eason

May 16, 1944.  C. M. EASON  2,348,891

CLUTCH CONTROL MECHANISM

Filed Jan. 15, 1942  6 Sheets-Sheet 4

Inventor:
Clarence M. Eason

May 16, 1944.  C. M. EASON  2,348,891
CLUTCH CONTROL MECHANISM
Filed Jan. 15, 1942  6 Sheets-Sheet 5

Inventor:
Clarence M. Eason

Patented May 16, 1944

2,348,891

UNITED STATES PATENT OFFICE 2,348,891

CLUTCH CONTROL MECHANISM

Clarence M. Eason, Waukesha, Wis.

Application January 15, 1942, Serial No. 426,817

30 Claims. (Cl. 192—12)

The present invention relates to clutch control mechanism, and embodies improvements upon the disclosures in my prior applications: Serial No. 185,679, filed January 19, 1938, issued as Patent No. 2,268,578 on January 6, 1942; Serial No. 279,899, filed June 19, 1939, issued as Patent No. 2,308,679 on January 19, 1943; Serial No. 282,588, filed July 3, 1939, issued as Patent No. 2,308,680 on January 19, 1943; and Serial No. 415,022, filed October 15, 1941, issued as Patent No. 2,340,416 on February 1, 1944.

All of the above applications show friction clutches of the type wherein one clutch element is shifted into and out of engagement with a companion clutch element, and each application features an improved control mechanism for controlling such shifting movement. The present application likewise embodies improved control mechanism for controlling the shifting movement of a shiftable clutch element.

One of the principal features of the present invention is the provision of control mechanism characterized by a single brake drum serving the dual purpose of (1) controlling the engaging and releasing of the clutch, and (2) holding the driven clutch element and load against motion when the clutch is released. In two of my above listed applications, Serial No. 282,588 and Serial No. 415,022, I have disclosed improved control mechanisms characterized by a double brake drum arrangement wherein one brake drum controls the engaging and releasing of the clutch, and the other brake drum, operated substantially simultaneously therewith, holds the driven clutch element and load against motion when the clutch is released. In the control mechanism of the present application, a single brake drum is enabled to perform both functions by giving this single brake drum separate control motions in two directions, i. e., (1) an axial shifting motion for controlling the engaging and releasing of the shiftable clutch element, and (2) a rotary motion for controlling the rotation and non-rotation of the shiftable clutch element.

The invention is of greatest utility for driving a punch press or other single stroke or single trip machine. Where the invention is embodied in this type of machine, the operating relation is such that when the brake mechanism is actuated to retard the rotary motion of the aforementioned single brake drum, this drum is thereupon compelled to shift axially, and this shifting movement is transmitted to the shiftable clutch element for releasing the clutch. Upon the brake mechanism becoming fully engaged, the brake shoes hold the brake drum against both rotary motion and shifting motion, and hence the shiftable clutch element is held in this shifted, clutch-releasing position and the crank shaft of the punch press is also held against rotation, these two locking or holding functions being maintained as long as the brake remains engaged. Immediately upon release of the brake, the brake drum is free to shift back to its original axial position for engaging the clutch, and, of course, the drum is also free to rotate so that the crank shaft can be driven by the clutch.

Another feature of the present invention is the provision of improved safety functions to thoroughly safeguard the clutch against accidental repeating operation when set for single trip operation. These improved safety features become of decided importance in clutches designed to handle higher speeds, such as the clutch of the present application. A continuous trend toward higher and higher press speeds approaching 1000 R. P. M. has greatly complicated the control of these press clutches. For example, when operating an older type punch press under the relatively slower speeds of approximately 100 to 150 R. P. M. heretofore prevailing in heavy duty work, it was not difficult for the operator to depress the tripping pedal for causing a single stroke operation and to then quickly remove his foot from the pedal before another single stroke operation could start. However, when operating a press at considerably higher speeds, approaching 1000 R. P. M., it is almost physically impossible for the operator to depress the tripping pedal through its full range of movement for causing a single stroke operation, and still get his foot off the pedal quick enough to prevent another cycle of operation. Accordingly, greater hazards are introduced into the operation of the clutch control mechanism by these higher speeds.

Another feature or object of the present invention is to provide improved control apparatus which provides for (1) single-trip operation, (2) manually controlled repeating operation, and (3) electrically controlled repeating operation.

Another feature of the invention resides in a unitary assembly of the brake shoes and the various control parts on a single mounting plate or housing, whereby these various parts can be handled substantially as a unit assembly in mounting them on the frame of the punch press.

Other features, objects and advantages of the invention will appear from the following detailed description of certain preferred embodiments thereof. In the accompanying drawings illustrating such embodiments:

Figures 1, 11:
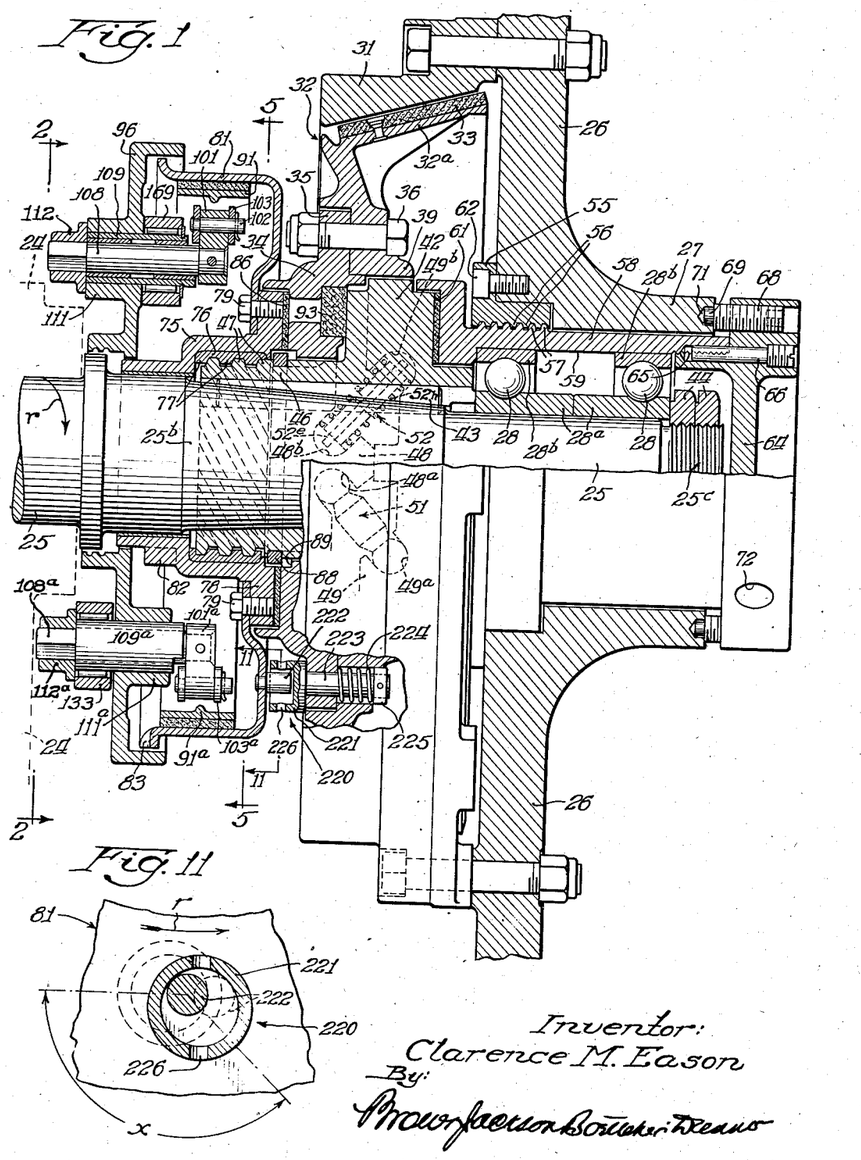
Figure 1 is a fragmentary longitudinal sectional view through one form of the invention, showing the brake engaged and the clutch released.
Figure 11 is a detail sectional view on an enlarged scale, taken on the plane of the line 11—11 of Figure 1, showing an optional addition which may be included in the structure for holding the clutch released during die setting operations.
Figure 12:
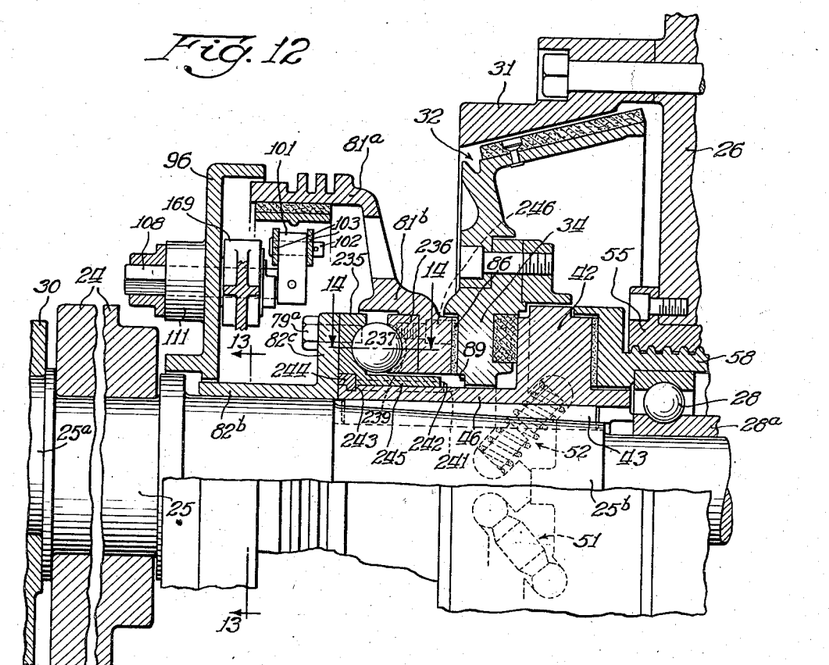
Figure 12 is a fragmentary longitudinal sectional view of a modified form of my invention.

Referring first to Figure 1, the adjacent side portion and end bearing of the punch press is indicated fragmentarily at 24, and the crank shaft is indicated at 25, the latter being provided with a crank 25a for driving the ram 30, as shown in Figure 12. The flywheel, belt wheel, bull gear, or other driving element is indicated at 26. The hub portion 27 of said belt wheel or bull gear is journaled on the reduced outer end of the crank shaft 25 through the medium of thrust resisting anti-friction bearings 28. The driving element of the clutch comprises a female cone member 31 which is secured to the flywheel 26. The driven element of the clutch comprises a coacting male cone 32a, this being shiftable axially for effecting clutching engagement with the non-shiftable female cone 31. The shiftable male cone is one part of an assembly which makes up the shiftable clutch element, and which I have designated 32 in its entirety. Any suitable clutch lining material 33 is riveted to the male cone 32a.

The shiftable clutch element 32 comprises a reduced central hub structure 34 having a radially extending flange 35 to which is secured the web portion of the driven cone 32a by the bolts 36 passing through said web portion and through said flange. Said web portion is also formed with a laterally projecting flange or ring portion 39 which partially houses the servo struts and the spring struts to be hereinafter described. Embraced substantially within the hub structure 34 and flange 39 is the thrust reaction member 42 which receives the thrust reaction of the toggle struts and establishes the torque transmitting connection between the shiftable clutch element and the crank shaft 25. Said reaction member 42 is rigidly anchored to the shaft 25 by a drive key 43 and by a tight fit on a tapered portion 25b of said shaft, although it will be understood that a splined connection may be employed in lieu thereof if desired. The reaction member 42 is forced up on the tapered shaft portion 25b by nuts 44 which screw up over a thread 25c at the outer end of the crank shaft. These nuts transmit inwardly acting pressure through the inner races 28a of the anti-friction bearings 28 to the outer end of the thrust reaction member 42. Formed integral with the thrust reaction member 42 and extending inwardly therefrom toward the press frame is a long sleeve 46 having helical splines 47 formed in its outer surface. As hereinafter described in detail, a cooperating outer splined member or nut is caused to run axially along the helical splines 47 in the operation of disengaging the clutch.

Referring now to the torque responsive servo mechanism which is arranged to act between the shiftable clutch assembly 32 and the thrust reaction member 42, I preferably employ the toggle strut type of servo mechanism, such as is illustrated in my copending applications Serial No. 279,899, filed June 19, 1939, and Serial No. 282,588, filed July 3, 1939, although it will be understood that the present invention is not limited to this particular clutch structure or to this form of servo mechanism. Inasmuch as this strut type of servo mechanism is illustrated in complete detail in said copending applications, I have only made a schematic illustration thereof in the present drawings. Briefly describing this strut apparatus therefrom, it will be seen that the shiftable clutch member 32, or more particularly the central hub structure 34, is formed with a plurality of lugs or bosses 48 which project laterally toward the right, and it will also be seen that the thrust reaction member 42 is formed with a plurality of lugs or bosses 49 which project laterally toward the left, the lugs or bosses of one member alternating or extending into the spaces between the lugs or bosses of the other member around the peripheries of the members. Interposed between these alternating bosses are the driving toggle struts 51 and the spring toggle struts 52. The driving struts 51 are solid fixed-length steel units somewhat resembling dumb-bells, the spherical end heads being relatively large and being accurately machined and ground for sustaining high compressive thrust loads through said end heads with minimum friction. These spherical end heads engage respectively within the spherical sockets 48a and 49a formed, respectively, within the bosses 48 and the bosses 49. These sockets are accurately machined and ground, and are preferably of a slightly larger radius than the ball ends of the struts. The reverse driving, spring toggle struts 52 each comprise the two separate shank portions having semi-circle heads at their outer ends. The two strut sections are both slidable along an axial pin 52e, the ends of which carry suitable stop rings which have snap engagement within annular grooves formed in the axial pin. These stop rings play within outer counterbores in the two strut sections, thereby limiting outward extensibility of the strut. A relatively heavy compression spring 52h encircles the spring struts and has its ends abutting the annular shoulders defined by the under sides of the semispherical end heads. The latter end heads have rockable bearing mounting within the spherical sockets 48b and 49b which are accurately machined and ground within the bosses 48 and 49, similarly to the sockets 48a and 49a.

There are preferably three pairs of such driving and spring struts 51 and 52 arranged in equidistant angular spacing in the circular area between the shiftable hub member 34 and the thrust reaction member 42. Of course, any desired number of pairs may be employed, but three pairs afford a three-point application of the spring pressure and also of the servo pressure. In this regard, my invention contemplates either a construction in which the shifting and rotating movement of the shiftable clutch member 32, incident to clutch engagement and release, occurs on a bearing surface afforded by the outer periphery of the thrust reaction member or its sleeve 46, or, in the alternative, where this shifting and rotating movement occurs as a floating motion on the struts so that rocking, tilting, radial displacement, or a veritable universal joint action is permitted for enabling most effective coaction between the driving and driven cones.

The helical angle of each strut is an angular relation of the strut with respect to the axial line of the clutch. The forward driving struts 51 are all inclined at the same common angle with respect to this axial line, and the reverse driving spring struts 52 are all reversely or oppositely inclined at the same common angle with respect to this axial line. In the embodiment illustrated, this angular inclination is of substantially the same degree for both sets of struts, although the two sets may be disposed at considerably different angles, if desired. The degree of engaging pressure ultimately established in the clutch by the servo action of the struts can be proportioned as desired by varying the angular inclination of the struts. For example as the angle of inclination of the struts 51 is made to approach the plane of rotation the servo action diminishes, and as the angle of inclination is made to approach the axial plane the servo action increases.

With reference to the spring struts 52, the springs of these struts function as the loading springs which normally tend to force the shiftable clutch element 32 into engagement with the nonshiftable clutch element 31. It will be observed that by virtue of their inclined positions, these struts impart an axial component and a rotating component to the shiftable clutch element. The axial component is further supplemented by the toggle action of the driving struts 51. The normal direction of rotation of the clutch and crank shaft is indicated by the arrow r. It will be noted that the spring struts tend to produce relative rotation between the driven clutch element 32 and the thrust reaction member 42 in opposite directions, i. e., they tend to rotate the driven clutch element in the forward direction of rotation r and, at the same time, they tend to rotate the thrust reaction member 42 and the connected crank shaft 25 in the reverse direction of rotation. It is the compression springs on these spring struts 52 that are placed in the loaded or cocked condition by the inertia of the crank shaft and its connected parts when the clutch is disengaged, and which normally stand ready to effect engagement of the clutch instantly upon the tripping operation. As fully discussed in my copending application, Serial No. 279,899, these spring struts can also function as reverse drive struts. It is frequently desirable to be able to back up the press ram during the operation of changing or setting the dies, or freeing the movable dies from a jammed condition in the work, and such can be readily accomplished in my improved construction by the action of the spring struts contracting to a solid condition when the relative rotation between the clutch member 32 and the thrust reaction member 42 is in the direction tending to compress each strut 52.

My invention also embodies improved and simplified means for adjusting the clutch to take care of wear, overload conditions, etc. This improved adjustment is effected by sliding the flywheel 26 and driving cone 31 inwardly or outwardly with respect to the shaft 25, driven clutch element 32 and reaction member 42. This shifting adjustment of the flywheel is effected by providing the latter with a nut or ring 55 formed with a heavy internal thread 56 which is adapted to screw over a thread 57 formed on an inner mounting sleeve 58. Said sleeve is formed with a counterbore 59 for engaging over the outer races 28b of the anti-friction bearings 28. A thrust ring or packing washer 61 is interposed between adjacent end faces of the thrust reaction member 42 and mounting sleeve 58. The threaded ring 55 is fixedly secured to the flywheel 26 by the cap screws 62. Secured in the outer end of the mounting sleeve 58 is an end cap 64, which has a threaded joint connection 65 with the sleeve. Two or more diametrically opposite lock pins 66 thread into tapped bores in the end cap 64 and extend into drilled holes which intersect the threaded joint 65. These lock pins 66 must be removed in the assembly and disassembly of the sleeve and end cap. The inner end of the end cap affords an internal shoulder for preventing outward displacement of the external race 28b of the outer bearing 28. Two or more diametrically opposite set screws 68 thread into tapped bores in the outer portion of the end cap 64 and have pointed extremities 69 which are adapted to be received within sockets 71 bored in the end face of the flywheel hub 27. There are preferably twenty or more of these sockets 71 bored equidistantly around the end face of the hub 27 so that the shift of the set screws 68 from one pair of sockets 71 to the next results in only a relatively small angular shift between the end cap 64 and hub 27. Three or four bar holes 72 are formed around the outer periphery of the cap 64 for receiving a crow bar or other like tool for the purpose of turning the end cap relatively to the flywheel. In adjusting the flywheel for wear of the clutch facing 33, or to raise or lower the overload slippage point of the clutch, the set screws 68 are backed out of the sockets 71 and the end cap 64 is then rotated in one direction or the other through the instrumentality of a tool inserted in the holes 72. This shifts the flywheel 26 either inwardly or outwardly along the mounting thread 57, as desired, whereupon the set screws 68 are then reengaged in the next nearest pair of holes 71.

Referring now to the first embodiment of my improved clutch control mechanism, a sleeve or nut 75 is assembled over the helical splines 47, and is provided with an internal filling of Babbitt or like metal 76 in which are formed companion splines 77 which remain in constant mesh with the inner helical splines 47. Secured to an outer radial flange 78 of said sleeve, by cap screws 79, is a brake drum 81. As best shown in Figure 1, the shiftable sleeve 75 has a reduced portion extending inwardly beyond the splined portion, and this reduced portion is formed externally with a cam 82 (Figure 5) which functions in the manner of a power actuated stopping device for releasing or stopping the operation of the mechanism. An emergency stopping shoulder 83 is also formed along the flanged inner edge of the brake drum 81, for a purpose which I shall later describe, and the cap screw attachment 79 between the flange 78 and brake drum 81 enables angular timing adjustments to be made between the stopping cam 82 and the crank shaft. A thrust ring 86, preferably composed of friction material, is interposed between the outer face of the flange 78 and the adjacent surface of the hub member 34.

It is desirable to limit the clutch engaging pressures which the servo toggle struts 51 can exert against the shiftable clutch element 32, in order to prevent overloading the press crank shaft. Therefore a snap type of pressure short circuiting ring 88 is snapped into an annular groove formed in the sleeve 46. The projecting outer portion of this ring is adapted to be engaged by an internal shoulder 89 formed in the shiftable clutch hub member 34, thereby short circuiting or limiting the axial pressure of the drive struts to definite predetermined values. The amount of axial pressure is determined by the axial positioning of the driving cone 31 with respect to the driven cone 32, such adjustment being accomplished by means of the threaded nut or ring 55 and the threaded mounting sleeve 58 and associated parts as previously described.

As pointed out in the general statement of the present application, the single brake drum 81 performs the dual function of releasing the clutch 31, 32, and of holding the driven clutch element 32 against rotation. It will be apparent that this brake drum 81 will rotate concurrently with the internally splined sleeve or hub 75, and will also shift axially with this sleeve or hub. Braking retardation is exerted outwardly against the brake drum 81 by two internal brake shoes 91, 91a which are preferably of the self-energizing type. These brake shoes are securely mounted to sustain side thrust, in order that they can lock the brake drum 81 against shifting movement as well as against rotating movement. The brake drum 81 rotates approximately concurrently with the driven clutch element 32 (subject to some limited rotative play therebetween), and during the time that the clutch is engaged, with the driven clutch element 32 rotating, the brake drum 81 is also rotating. In the operation of releasing the clutch and stopping the mechanism, the brake shoes 91, 91a begin exerting braking retardation against the drum 81. This causes the drum and helically splined sleeve to screw in an outward direction along the internal splines 47, thereby shifting the driven clutch element 32 to the clutch releasing position. The braking retardation which retards and finally locks the brake drum 81 against rotary movement also serves to hold the brake drum against shifting movement. Hence, when the brake drum arrives in its final shifted position, it is held against return shifting movement by the brake shoes 91, 91a. Figure 1 illustrates the clutch in this disengaged position, with the brake drum 81 shifted axially toward the right for holding the clutch in this position. The limit of motion of the shiftable clutch element in this releasing direction is preferably determined by stop blocks or cushion blocks 93 composed of rubber, fiber or other like material, these blocks being set into recesses in the hub member 34 and being adapted to abut the opposing face of the reaction member 42.

Figure 2:
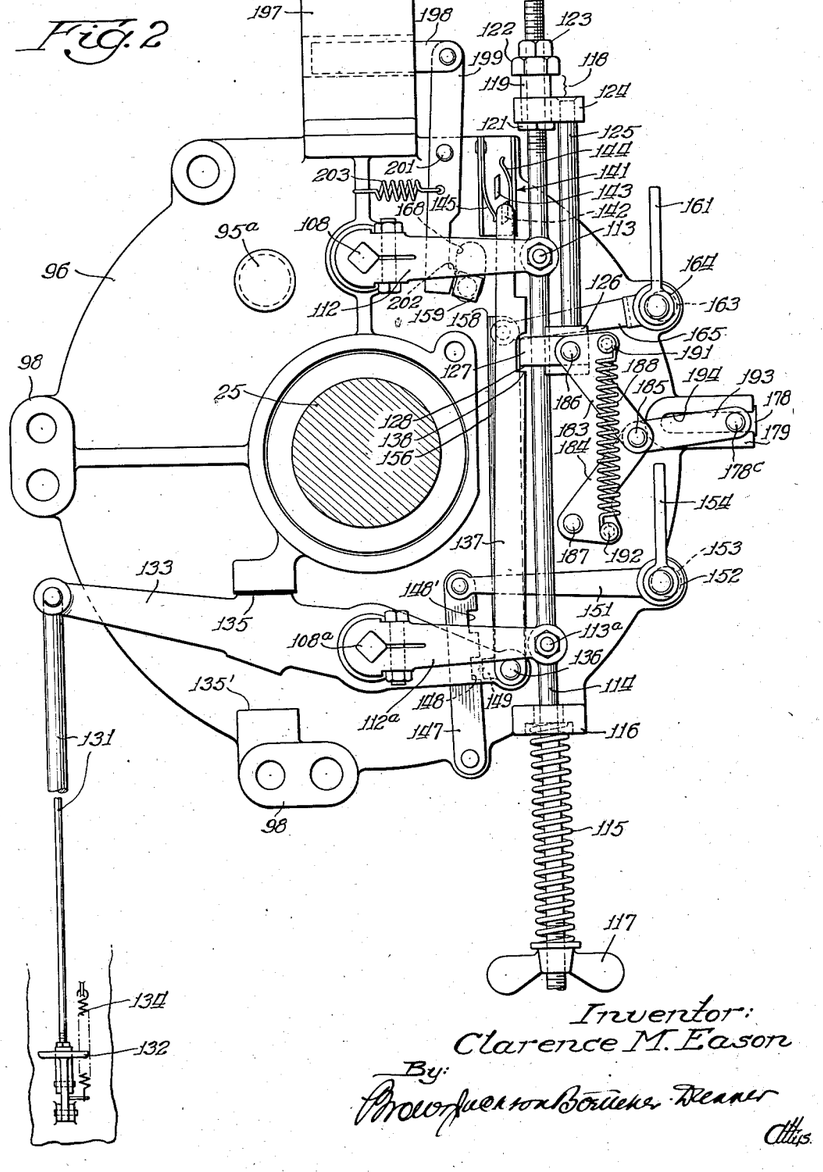
Figure 2 is a transverse sectional view taken approximately on the plane of the line 2—2 of Figure 1, showing the control linkage of the operating mechanism in this brake-engaged, clutch-released position.
Figure 5:
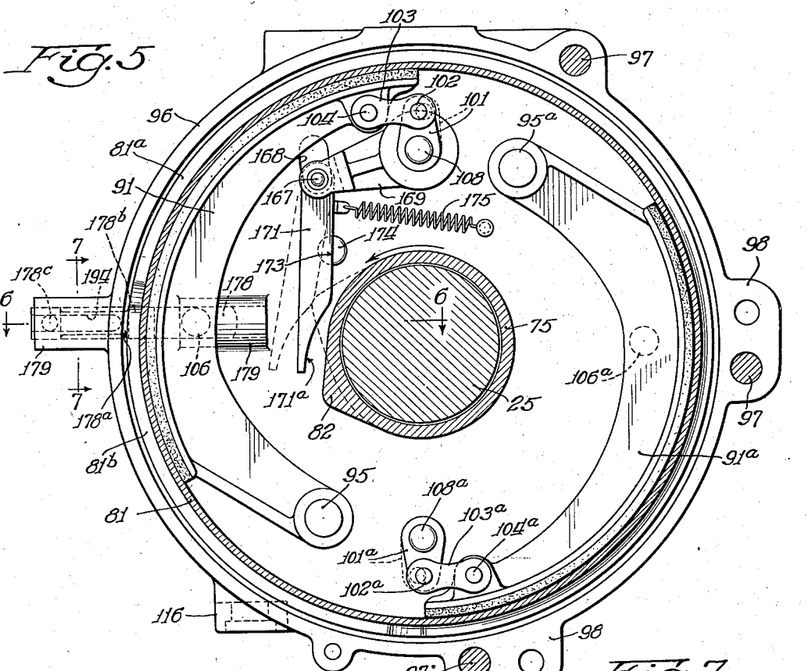
Figure 5 is a transverse sectional view through the brake mechanism, taken approximately on the plane of the line 5—5 of Figure 1, showing the brake engaged and the operating parts in the position corresponding to single-trip operation.

Referring to Figure 5, the brake shoes 91, 91a have their trailing ends pivotally mounted on stationary pivot studs 95, 95a which project outwardly from a stationary mounting plate or housing 96. This housing plate 96 is bolted to the side of the press frame 24, such as by cap screws 97 passing through attaching lugs 98 projecting from the plate. The leading ends of the two brake shoes 91, 91a are adapted to be swung into and out of engagement with the inner peripheral surface of the brake drum 81 through the actuation of crank arms 101, 101a which have pivotal connection at 102, 102a with links 103, 103a, the other ends of said links being pivotally connected at 104, 104a with the brake shoes. In order to reenforce the mounting of the brake shoes against the axial shifting forces exerted on the brake drum 81, the housing plate or support 96 is formed with diametrically opposite thrust sustaining lugs 106, 106a which are adapted to bear against the web portions of their respective brake shoes (Figure 6) to reenforce the shoes against thrusting stresses acting toward the press frame. The crank arm 101 for the brake shoe 91 is mounted on an actuating shaft 108, and the crank arm 101a is mounted on a corresponding actuating shaft 108a. As shown in Figure 1, these actuating shafts have needle bearing mounting in bearing sleeves 109, 109a, the sleeve 109 being fixedly mounted in a boss 111 projecting outwardly from the web of the frame plate 96, and the sleeve 109a being fixedly mounted in a boss 111a projecting inwardly from said web. The outer ends of these actuating shafts are formed with square extensions, and clamped to such extensions are laterally extending actuating arms 112, 112a (Figure 2). These arms are pivotally connected at 113, 113a with a reciprocating brake actuating rod 114. Continuous brake engaging tension is exerted downwardly through this rod by a compression spring 115 surrounding the lower end of the rod. The upper end of said spring abuts against a reaction lug 116, through which the rod has a loosely guided fit, and the lower end of said spring abuts against a thumb screw 117 which screws over the threaded lower end of the rod, and serves to adjust the pressure of the spring 115. Said spring tends constantly to engage the brake shoes against the brake drum. The upper end of the brake actuating rod 114 is threaded for mounting an adjustable lost-motion gap 118 which can be shifted upwardly or downwardly along the length of the rod. Said lost motion gap is defined by a thimble or sleeve 119 which screws down over the threaded end of the rod, this thimble having a flanged lower end 121, and being locked in place at any adjusted point along the length of the rod by nuts 122, 123 having lock nut action against the upper end of the thimble. A slide block 124 has guided sliding fit over the thimble 119 and normally bears against the lower shoulder 121, but is adapted to impart motion to the brake actuating rod 114 after moving upwardly through the length of the lost motion gap 118 and striking the under side of the nut 122.

It will be understood that by appropriate manipulation of the thimble 119 and upper nut 122, the lost motion gap 118 can be shifted upwardly or downwardly along the length of the brake actuating rod, and can also be varied in length, if desired.

The slide block 124 has riveted attachment to the upper end of a reciprocatory rod 125 which is attached at its lower end to a block 126 arranged for sliding movement along the brake actuating rod 114. The block 126 carries a stirrup portion 127 which embraces the rod 114 and defines an actuating shoulder 128.

Manually actuated tripping motion is adapted to be imparted to the shoulder 128 whenever it is desired to start the cycle of the punch press, either for single trip operation, repeated operation, or solenoid control. This manually actuated starting mechanism comprises a treadle rod 131 which is operatively connected at its lower end with any suitable foot treadle 132 and which is operatively connected at its upper end with a long rocker lever 133. The treadle 132 can be of any conventional construction, and is usually urged into an upper position by a spring 134 which also holds the lever 133 in the upper position illustrated in Figure 2. Said lever plays between upper and lower end strips 135, 135' projecting from the supporting plate 96, and the lever has a needle bearing fulcrum mounting on the projecting outer end of the bearing sleeve 109a, concentrically of the shaft 108a (Figure 1). The opposite, short arm of the lever has pivotal connection at 136 with a tripping link 137 provided with a notched shoulder 138 adapted to engage the shoulder 128 on the guide block and stirrup 126, 127. The shoulder 138 is adapted to be automatically tripped from the shoulder 128 when the link 137 is nearing the upper limit of its movement, such being effected by an automatic change-over deflector 141. This deflecting mechanism comprises a movable deflector block 142 which is secured to the reverse side of the link 137. Such movable block has correspondingly inclined upper and lower surface which are adapted to cooperate with similarly inclined surfaces at the upper and lower ends of a stationary guide block 143 mounted in the deflector device. Leaf springs 144 and 145 are mounted on opposite sides of the stationary block 143, the upwardly extending leaf spring 144 serving to deflect or transpose the movable block 142 from the right side to the left side of the stationary block 143 in the upward oscillation of the link 137, and the downwardly extending leaf spring 145 serving to deflect or transpose the movable block from the left side to the right side of the stationary block in the downward oscillation of the link 137. When the link 137 is deflected from the right hand track to the left hand track of the deflector mechanism, the shoulder 138 is thereby tripped out of engagement with the shoulder 128 on the stirrup 127. The treadle rod 131, lever 133, and link 137 may be regarded as parts of a manually actuated starting mechanism for starting the cyclical operation of the clutch, the further operation of which may be made selectively dependent upon the setting of control parts which determine whether the clutch shall respond to single trip operation, repeating operation, or to electrical control, as will be hereinafter described. When setting dies in the punch press or performing other like operations, it may be desirable to lock the lever 133 either in its elevated position or in its depressed position, and this can be readily accomplished through a locking lever 147 having locking notches 148, 148' adapted to engage over a lug 149 projecting from the link 137. An actuating link 151 has one end pivotally connected with the locking lever 147, and has an eccentric follower portion 152 formed at its other end. Said eccentric follower portion engages over an eccentric 153 which is adapted to be oscillated through 180° by the throwing of a pivoted thumb piece 154 from an upper to a lower position. By throwing this thumb piece down to its lower position, the tripping lever 133 can be locked in its upper position, with the notch 148 engaging over the lug 149, or it can be locked in its lower position, with the notch 148' engaging over the lug 149.

Disposed directly behind the tripping link 137 and moving up and down concurrently therewith is a repeat control link 156, the lower end of which is pivotally mounted on the same pivot stud 136 that carries the link 137. Said link 156 has an actuating shoulder 158 at its upper end which normally moves up and down through a path which is clear of an actuating block 159, but said link 156 and shoulder 158 can be swung inwardly to another path where the shoulder 158 is adapted to strike the block 159 and carry the latter upwardly with it. A thumb-piece 161, pivotally mounted on the housing plate 96, carries an eccentric 163 which engages in an eccentric follower 164, formed at the outer end of a link 165. The other end of said link is pivotally connected with the upper portion of the repeat control link 156. When the thumb piece 161 is in the upper position illustrated in Figure 2, the link 156 oscillates vertically in its outer path where it clears the block 159, whereas when the thumb piece 161 is swung down to the position shown in Figure 8 the link 156 is caused to oscillate vertically in the inwardly disposed path, where the shoulder 158 is brought into engagement with the block 159.

Figure 9:
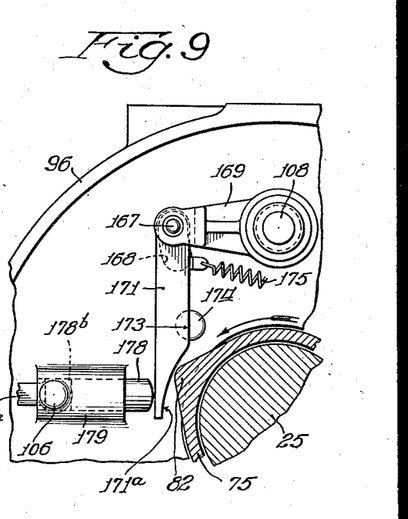
Figure 9 is a fragmentary view inside the brake mechanism and related to Figure 8 for the purpose of showing the position of the retractable motion transmitting member when the control apparatus is set in the repeating position.

The block 159 has a shank portion 167 which extends through an arcuate slot 168 formed in the supporting plate 96, this shank being secured in the outer end of a swinging lever 169 mounted within the housing plate 96, as shown in Figure 5. The hub of the arm or lever 169 has an anti-friction mounting on the upper bearing sleeve 109 which supports the upper brake actuating shaft 108 (Figure 1). Pivotally mounted in the bifurcated end of the arm 169, on the shank or pin 167, is a retractible motion transmitter 171 which is adapted to be actuated by the aforementioned cam 82 that rotates with the helically splined sleeve 75. This motion transmitter and cam constitute part of a power actuated stopping mechanism for releasing the clutch and stopping the press. The right hand edge of the retractible member 171 is adapted to have vertical sliding motion along a guide surface 173 formed by milling off one side of a stud 174 projecting outwardly from the housing plate 96. A tension spring 175 is hooked between the retractible member 171 and a stationary point of anchorage on the housing plate, this spring tending to hold the member 171 against the guide surface 173, and also tending to hold the arm 169 and member 171 in their lower positions, as shown in Figure 5. The retractible member is formed with an arcuate inner surface 171a which is arranged to clear the path of the cam 82 when the motion transmitting member is retracted upwardly to its non-functioning position, as shown in Figure 9.

Figure 7:
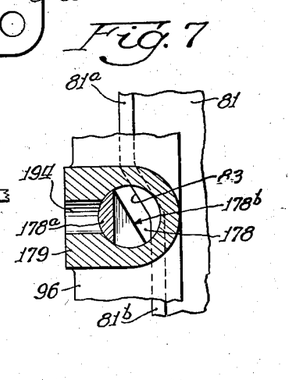
Figure 7 is a detail sectional view on a slightly larger scale, taken on the plane of the line 7—7 of Figure 5.

When the retractible motion transmitter 171 is in the lower, operative position shown in Figure 5, it functions to transmit motion from the rotating cam 82 to a reciprocable plunger 178 which is adapted to trip a holding toggle for applying the brake, and also to interpose a positive blocking member in the path of the brake drum 81 if applying the brake does not bring the parts to rest quickly enough. The plunger 178 is guided for reciprocatory motion in a cylindrical guide bore 179 projecting outwardly from the mounting plate 96. Cut down through the forward side of the guide bore 179 is a notch 181 through which revolves the flanged rim 81a of the brake drum 81. As previously described, this flanged rim of the drum is formed with a positive stop surface 83 which is adapted to positively stop rotation of the brake drum if there should be any accidental over-travel of the drum after the brake shoes have been brought into stopping engagement with the drum. Referring to Figure 7, this stop surface 83 may be formed by indenting an arcuate span of the drum flange as shown at 81b, this indented portion being joined to the main flange portion 81a through the inclined surface 83, which functions as the positive stop surface. The plunger 178 formed with a relatively long clearance notch 178a which is brought into registration with the transverse notch 181 as soon as the plunger is projected inwardly, such occurring simultaneously with the engagement of the clutch, as will hereinafter appear. When the plunger has been shifted to this position, the positive stop surface 83 on the brake drum can revolve through the notch 181 without being blocked. However, as soon as the plunger 178 is again projected outwardly, in the operation of releasing the clutch and setting the brake, thereupon an inclined positive stop surface 178b, located at the inner end of the clearance notch 178a, moves into blocking position in the path of the rotating stop shoulder 83. If the brake shoes should fail to bring the brake drum to rest within a precalculated range of safety, then the rotating stop surface 83 comes up against the stationary stop surface 178b. Because these stop surfaces are angularly inclined, a heavy shifting force is immediately exerted on the brake drum 81, tending to slide the brake drum axially outwardly or toward the right (Figure 1), which motion of the brake drum is in the clutch releasing direction. Hence, the initial engagement of the two stop surfaces first imparts increased shifting force to the shiftable clutch element for disengaging the clutch. The parts are so proportioned, however, that the moving stop surface 83 cannot crowd past the stationary stop surface 178b in such clutch releasing operation, but these stop surfaces positively stop continued motion of the brake drum after such additional shifting motion.

Figures 3, 4:
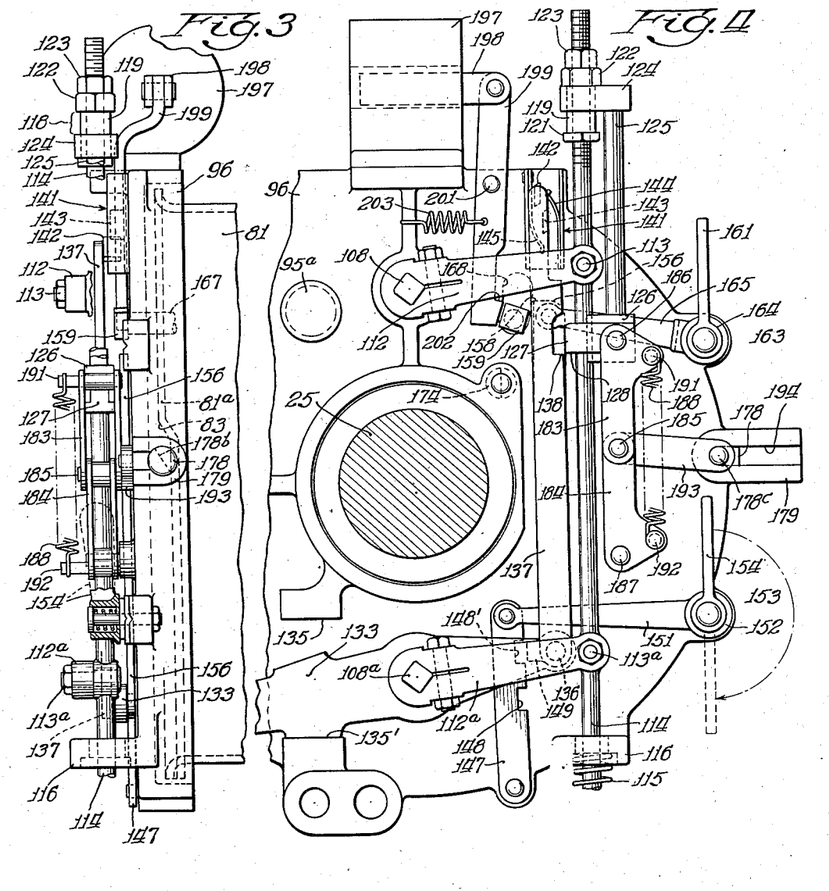
Figure 3 is a fragmentary edge or side view of this control apparatus.
Figure 4 is a fragmentary view similar to Figure 2, but showing the control apparatus in the brake-released, clutch engaged position, pursuant to the performance of a manually controlled single-trip operation.
Figure 6:
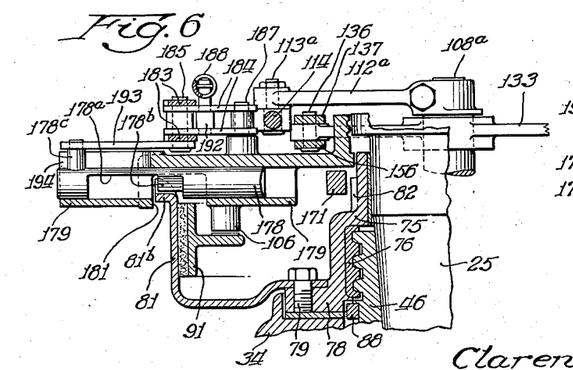
Figure 6 is a horizontal detail sectional view taken approximately on the plane of the line 6—6 of Figure 5.

I shall now describe the toggle holding mechanism which holds the brake released and the clutch engaged as soon as the manually actuated starting mechanism 133, 137, 114 is actuated. This toggle holding mechanism holds the brake released until the power actuated stopping parts, comprising the cam 82, motion transmitter 171 and plunger 178, trip the toggle and restore it to normal position. Referring to Figure 2, said toggle mechanism comprises an upper toggle link 183 and a lower toggle link 184 pivotally connected together by a knuckle pivot 185. The upper end of the upper link has pivotal mounting on a pin 186 carried by the slide block 126, and the lower end of the lower toggle link is pivotally supported on the stationary pivot stud 187 projecting laterally from the support member 96. A tension spring 188 has its ends connected to pins 191 and 192 projecting laterally from the upper and lower toggle links, these points of spring attachment being spaced outwardly from the pivot pins 186 and 187 so that when the toggle links are in dead center alignment (as shown in Figure 4), the tension of the spring 108 continues to act tending to hold the toggle in or carry it beyond this dead center position. In the actual construction best shown in Figures 3 and 6, each toggle link preferably comprises a pair of spaced parallel links for greater lateral strength and stability. Pivotally connected with the knuckle pivot 185 is a drag link 193 which has its outer end pivotally connected with a stud 178c projecting laterally from the aforementioned plunger 178. As shown in Figure 6, this stud 178c is adapted to slide back and forth within a guide slot 194 formed in the adjacent wall of the guide boss 179, this guided relation holding the plunger 178 against any angular rotation, such as might tend to rotate the positive stop shoulder 178b out of proper position. When the control apparatus is in the normal brake-engaged, clutch-released position shown in Figure 2, the action of the tension spring 188 is tending to collapse the toggle 183, 184, pulling downwardly on the upper toggle link 183 and thereby pulling the slide block 126, rod 125 and slide block 124 downwardly. The lower limit of motion of these parts in this downward direction is defined by the slide block 124 striking the lower head 121 of the vertically adjustable thimble 119 mounted on the spring rod 114. With the toggle thus collapsed or broken, and the parts 124—126 in their lower positions, the drag link 193 has been thrust outwardly for disposing the positive blocking plunger 178 in the normal, outwardly shifted position illustrated in Figure 6. Figure 4 illustrates the other position of the toggle, with the links 183, 184 and knuckle pivot 185 substantially in dead-center alignment. In this position of the parts, the clearance gap 118 above the slide block 124 has been closed, with the slide block abutting against the upper shoulder 122. The dead-center alignment of the toggle at this time causes it to function as a stiff-legged strut for holding the block 124 against the shoulder 122 with the spring rod 114 raised up in its brake releasing position. At this time the drag link 193 has shifted the stud 178c up, against the inner end of the slot 194, which functions as an end stop for holding the toggle in dead center alignment. Such shifting of the stud has also shifted the tripping plunger 178 inwardly (to the position shown in Figure 9), where it is adapted to respond to motion transmitted from cam 82 through the motion transmitting member 171. It will be evident that motion transmitted from said cam through the retractible motion transmitting member 171 to the plunger 178 will be operable to break the toggle out of its dead center alignment, so that the toggle can collapse and permit downward movement of the brake actuating rod 114 into its brake engaging position.

Referring now to the apparatus which provides for electrically controlled repeating operations, it will be seen that an electrical solenoid or like electrically responsive means 197 is mounted on the upper portion of the supporting plate 96 and is adapted to actuate a solenoid core 198. The outer end of said shiftable core is pivotally connected with a latch 199 which is pivotally mounted at 201 on the supporting housing 96. A hook 202 on the lower portion of the latch is operable to engage under the adjacent corner of the swinging block 159 when said block is in its upper position and when said solenoid has been energized, as illustrated by the position of the parts in Figure 10. Immediately upon deenergization of the solenoid, a retracting spring 203 releases the shoulder 202 from the block 159 and permits the latter to swing down to its normal position at the lower end of the slot 168. As shown in the latter figure, the solenoid 197 is adapted to respond to a control circuit 205, 206 which derives current from any suitable source, such as the transformer 207. One or more control switches 208, 209 are interposed in the circuit 205, 206 to control the energization and deenergization of the solenoid 197. These switches may be arranged to respond to stock feeding mechanisms of continuous feed presses where the approach of the finishing end of the stock material interrupts the circuit to stop the press; or these switches may be arranged to respond to dial feeding mechanism, manual controls, etc.

Referring now to the operation of this first embodiment of the invention, when it is desired that the press clutch have the conventional single-trip operation, the selective control arm 161 is placed in the upper position illustrated in Figure 2, which holds the tripping link 156 retracted out of the path of the oscillatable block 159. When the operator steps on the tripping pedal 132, he causes the lever 133 to project both links 137 and 156 upwardly substantially to the positions shown in Figure 4. Such upward motion of the link 156 is an idle motion at this time because it is moving upwardly through its outer path which does not intersect the block 159. The other link 137, however, has imparted upward motion to the slide block 126, rod 125, and slide block 124. As soon as the clearance gap 118 has been taken up, the striking of the block 124 against the upper shoulder 122 oscillates the brake releasing rod 114 in an upward direction against the pressure of the spring 115. This swings the arms 112, 112a, shafts 108, 108a, and inner arms 101, 101a for swinging the brake shoes 91, 91a into their released positions, as indicated in dotted lines in Figure 5. The consequent freeing of the brake drum 81 permits the clutch engaging energy stored in the spring toggle struts 52 to come into action, this spring energy tending to shift the driven clutch element 32 toward clutch engaging position, and also tending to impart a rotative force to the shiftable clutch element, tending to revolve the latter in the direction of rotation of the driving clutch element. Accordingly, the helically splined outer sleeve 75 and brake drum 81 shift inwardly or to the left (Figure 1) and also run on ahead in the operation of engaging the clutch. Immediately upon engagement of the clutch surfaces, the entire torque load is transmitted through the servo toggle struts 51, with the result that a greatly augmented shifting force is immediately exerted against the shiftable clutch element 32, for forcing the latter into clutching engagement under higher and higher clutching pressures. It will be apparent that the pressure of engagement thus obtained between the clutch surfaces will be more or less proportional to the load transmitted to the clutch, subject to a predetermined maximum pressure limit established by the ring 88. In this regard, it should be noted that the reactions of the thrusting pressures created by the servo struts 51 are transmitted back through the reaction member 42, thrust bearings 28 and flywheel 26 to the driving cone 31 so that these clutch engaging forces are confined entirely within the clutch structure and are not transmitted outwardly to the press frame or crank shaft bearings, etc. Immediately upon engagement of the clutch, rotation is imparted to the crank shaft 25, shiftable sleeve 75, and brake drum 81. The cam 82 starts rotating immediately with the shiftable sleeve 75.

Referring now to the safety features which arise at this stage of the cycle, the automatic deflector mechanism 141 throws the link 137 into its left-hand position as this link moves upwardly into its upper position (Figure 4). Such lateral deflection of the link 137 moves the shoulder 138 out from under the shoulder 128 so that the slide block 126 is entirely free of the link 137, and is only held in its elevated position by the dead-center alignment of the toggle 183—185. Thus, if the operator should continue to hold his foot on the treadle 132 after the tripping of the treadle, the brake actuating rod 114 is still able to move downwardly to its original brake engaging position at the end of the cycle, even though the link 137 remains in its raised position. Still further, if the press should be operating at a relatively high speed so that it would be physically impossible for the operator to get his foot off the treadle in time, or would require tiresome concentration to bring this about each time he operated the press, it will be noted that even under these circumstances the automatic deflection of the link 137 for releasing it from the slide block 126 enables the brake actuating rod 114 to move downwardly to normal brake engaging position considerably ahead of the restoring movement of the lever 133 and link 137.

With continued rotation of the crank shaft during a single trip operation, the cam 82 finally strikes the motion transmitting link 171, which is disposed in its lower position at this time (Figure 5) because the link 156 has not struck the block 159 for swinging the motion transmitting member 171 upwardly out of the path of the cam. Accordingly, the motion transmitting member 171 transmits motion to the end of the plunger 178, causing the latter to be oscillated outwardly toward its normal outward position. The very first portion of the motion imparted to the plunger 178 breaks the toggle joint 183, 184 by pulling the knuckle pivot 185 out of dead center alignment, and immediately upon this initial breaking of the toggle the toggle spring 108 imparts a snap motion to the toggle parts for effecting a rapid collapse of the toggle. Since the strut function of the toggle is now broken, the brake actuating rod 114 quickly moves downwardly under the pressure of the spring 115, and rocks the brake actuating arms 101, 101a back into their normal positions, for causing the brake shoes 91, 91a to reengage with the brake drum under the self-energizing action of these brake shoes. The application of this retarding force against continued rotation of the brake drum 81 causes the brake drum and splined sleeve 75 to start screwing outwardly along the helical splines 47. Such shifting movement of the sleeve and drum exerts sufficient force against the shiftable clutch element 32 to overcome the servo action of the struts 51 and move the shiftable clutch element into clutch releasing position. The driven clutch element, reaction member 42, and crank shaft 25 immediately come to a stop under the rotative braking retardation imposed against the brake drum 81. This holding force exerted against the brake drum also prevents the latter from shifting inwardly back to its normal position. Hence, by thus holding the brake drum against rotary movement and against shifting movement the clutch is held disengaged and the crank shaft is also held against rotation. This brings the parts back to the normal position, preparatory to starting another cycle whenever the operator again depresses the treadle 132.

Assuming now that it is desired to have the press function with a manually controlled repeating operation, the selective control arm 161 is swung downwardly into its lowermost position (Figure 8), which swings the link 156 over into its inward path of travel where such link is operative to engage the block 159 and to oscillate said block to the upper end of the arcuate slot 168. This oscillation of the block into its upper position occurs as a part of the tripping operation performed by the operator when he depresses the treadle 132, the links 137 and 156 moving upwardly together. The oscillation of the block to the upper end of said slot retracts the motion transmitting member 171 into the upper position illustrated in Figure 9, where this member is entirely clear of the cam 82. In this condition of the control mechanism, the cam 82 is unable to impart motion to the plunger 178 for breaking the toggle 183, 184 out of its dead-center alignment. Accordingly, the toggle parts will continue to hold the rod 114 in its raised position, in which position the brake is released and the clutch is engaged. Accordingly, the press will continue to run without interruption as long as the operator continues to hold his foot on the treadle 132. Whenever the operator desires to stop the press, he merely releases the treadle 132, whereupon the link 156 moves downwardly and allows the block 159 and motion transmitting member 171 to move downwardly into their normal positions (Figure 5). Hence, the motion transmitting member 171 is now in position to receive the impact of the cam 82 as soon as the cam moves into its tripping position, and this tripping motion is immediately imparted to the plunger 178 for breaking the toggle joint and thereby engaging the brake and releasing the clutch.

Figure 8:
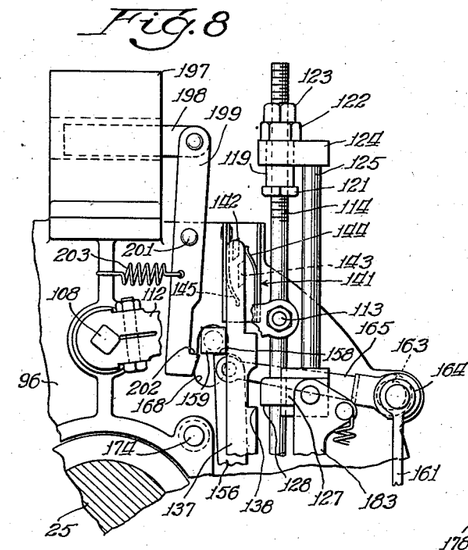
Figure 8 is a fragmentary elevational view of the control mechanism in the brake-released, clutch-engaged position in the performance of a manually controlled repeating operation.
Figure 10:
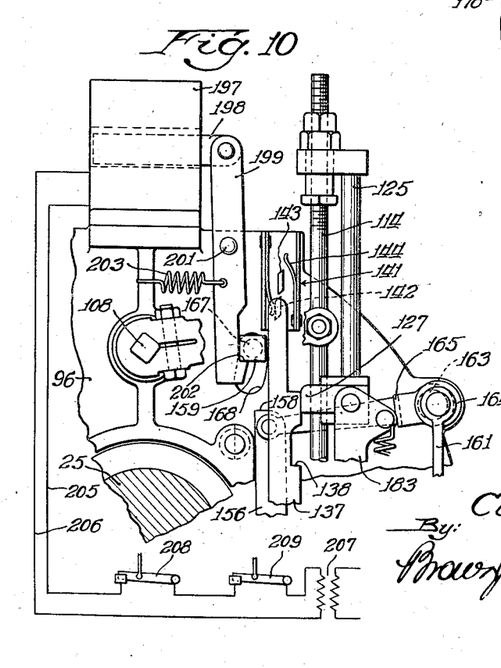
Figure 10 is a view similar to Figure 8 showing the solenoid responsive apparatus functioning during the performance of an electrically controlled repeating operation.

Whenever it is desired to cause the press to function with an electrically controlled repeating operation, the circuit 205, 206 is energized by the closing of the switches 208, 209, so that the solenoid 197 is energized to act on the shiftable core 198. Thereupon, the treadle 132 is depressed for initiating the cycle, the selector arm 161 having been swung down into its lower position (Figures 8 and 10). When the block 159 is oscillated upwardly into its upper position, the solenoid operated latch 199 immediately swings in under the block to hold the latter in the raised position. Thereupon, the operator can release the treadle 132 without permitting the block 159 to return to its normal position. Under such conditions, the press will continue to operate indefinitely until the solenoid 197 is deenergized by the opening of either of the switches 208 or 209, whereupon the spring 203 immediately retracts the latch 199 back to its normal position. This permits the block 159 to oscillate downwardly for moving the motion transmitting member 171 down into its effective position, whereupon motion is transmitted from the cam 82 through the member 171 to the plunger 178 for breaking the toggle joint and engaging the brake and releasing the clutch.

In any of the above three types of operation, if the brake drum 81 should fail to stop within a substantially predetermined degree of travel after the brake shoes 91, 91a have been swung outwardly against the drum, then the positive blocking function of the stop surface 178b on plunger 178 is brought into action. It will be apparent from the preceding description, that if the brake shoes fail to arrest rotary motion of the drum at the desired spaced point of stopping, then the positive stop surface 83 on the flanged edge of the drum will strike the inclined surface 178b, with the result that the drum will be forcibly shifted axially for forcibly releasing the clutch, and the drum will also be positively brought to rest in this same shifting operation, because the stop surface 83 cannot move past the stop surface 178b. It is desirable to bring the crank shaft 25 to rest substantially at the point where the crank and ram are at approximately upper dead-center position. This is desirable so that the weight of the ram and crank will not tend to continue the rotation downwardly to the point where the movable die might coast down into a dangerous position.

In the operation of changing dies, setting dies, and making other adjustments, it may be desirable to lock the clutch out in the disengaged position and leave the brake operable through the foot treadle 132 and treadle locking mechanism 147—154 for holding the crank shaft at any desired point. With the clutch released and the brake under control, the crank shaft and driven clutch element 32 can be slowly rotated or oscillated back and forth relatively to the flywheel 26 and driving clutch element 31. To obtain this die setting feature, I may provide as an optional adjunct to the previously described construction a clutch lock-out mechanism 220 (Figure 1) operative between the brake drum 81 and the driven clutch element 32. This mechanism comprises an eccentrically mounted socket 221 carried by the driven clutch element 32, and a cooperating stud or pin 222 carried by the brake drum 81 and engaging in the socket 221. The socket 221 is secured in eccentric relation to a mounting shank 223 which is rotatably supported in a hole provided in the bolting flange 35 of the hub member 34 (such as one of the holes for the bolts 36). The aligned opening in the web of the clutch element 32 is counterbored to receive a compression spring 224 which abuts against a collar 225 pinned to the end of the mounting shank. A plurality of holes 226 are formed in the socket member 221 to receive a tool for rotating the socket. Referring to Figure 11, the socket can be rotated from the full line position to the dotted line position by revolving the socket through the arc x, this shift of position resulting from the eccentricity of the mounting of the socket 221 on the shank 223. The direction of rotation is indicated at r, and it will be apparent that when the socket is in the full line position relative rotation can occur between the socket and the stud in such direction of rotation, whereas when the socket is in the dotted line position, relative rotation between the socket and the stud in this direction is precluded. The degree of angular freedom necessary between the driven clutch element and the brake drum 81 to effect engagement of the clutch is relatively small, and when the socket is in the full line position the stud can have such degree of freedom in the direction r. However, when the socket is in the dotted line position the stud cannot have this degree of freedom in that direction, and hence the clutch is locked out. The compression spring 224 serves to hold the socket in either of its two rotated positions, and, if desired, radial serrations or teeth may be provided on the abutting faces between the socket 221 and flange 35 for establishing a yieldable detent relation of the socket.

Figure 13:
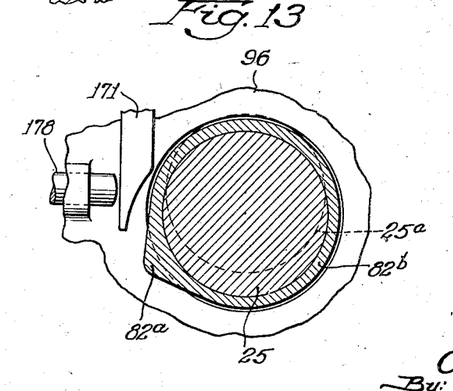
Figures 13 and 14 are detail sectional views taken approximately on the planes of the lines 13—13 and 14—14 of Figure 12.
Figure 14:
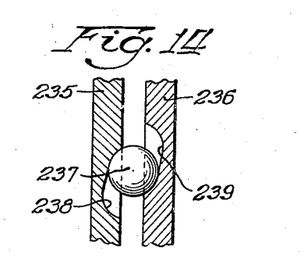

Referring now to the modified construction illustrated in Figures 12, 13 and 14, this modified construction is substantially identical with the previously described embodiment except that it substitutes ball-cam thrusting mechanism for the helical spline thrusting mechanism 47, 77 of the preceding embodiment. Said ball-cam mechanism comprises two circular cam plates or rings 235 and 236 between which are disposed balls 237. As shown in Figure 14, the opposing faces of the two cam plates are formed with coacting runways 238 and 239 for each of the balls 237. There are preferably three of these balls and coacting runways located at equidistantly spaced points around the cam rings. This ball cam mechanism is described in detail in my prior copending applications Serial Nos. 279,899, 282,588, and 415,022.

In this modified embodiment, the construction and arrangement of the driving clutch element 31, driven clutch element 32, mounting hub 34, and reaction member 42 are substantially identical with the construction and arrangement of the preceding embodiment. Hence, there will be no need of repeating the description of this part of the structure. The extension sleeve 46 of the thrust reaction member is modified, however, to the extent that the splines 47 are not formed thereon, but, instead, this sleeve is formed with a longitudinal outer keyway 241 for receiving a longitudinal key 242, and is also formed with an annular groove 243 for receiving a thrust ring 244. The non-shiftable cam ring 235 is formed with a sleeve extension 245 which fits over the sleeve 46 and is keyed thereto by the longitudinal key 242. The thrust ring 244 abuts a thrust shoulder formed in this cam ring or its extension sleeve, whereby to prevent shifting movement of the cam ring 235 toward the left. The shiftable cam ring 236 is supported on the sleeve 245 for rotative and shifting movement. The shiftable and rotatable brake drum 81a, which is shown as being a casting but might be a pressed shell as in the preceding embodiment, is provided with a hub portion 81b which is mounted on the shiftable cam ring 236, being secured to said cam ring by the screws 246. The outer face of this hub portion is adapted to transmit thrusting pressure to the shiftable clutch element 32 through the thrust ring 86, substantially as described of the preceding embodiment. The cam 82a is formed on a sleeve 82b formed with a radial flange 82c at its outer end, which flange is adjustably bolted to the cam ring 235 by the cap screws 79a. By removing these cap screws, the cam 82a can be rotated to different angular positions relatively to the crank shaft 25. The adjustment is with respect to the crank shaft owing to the fact that the cam ring 235 is keyed to the crank shaft through the key 242, sleeve 46, and key 43. Such angular adjustability of the cam 82a enables the timing of the power actuated clutch releasing function to be advanced or retarded for different press speeds and different operating conditions. The cam 82a functions identically with the cam 82 of the preceding embodiment, serving to impart motion to the motion transmitting member 171, which, in turn, actuates the tripping plunger 178, as described of the preceding embodiment. The brake mechanism and all of the control apparatus is substantially identical with that described above in connection with the preceding embodiment.

In the operation of this modified construction, braking retardation exerted against the rotary movement of the brake drum 81a causes the brake drum and hub 81b to impart lateral shifting movement to the shiftable clutch element, as a result of the spreading action which occurs between the cam rings 234, 236 as soon as the ring 236 is retarded rotatably with respect to the ring 235. As shown in Figure 14, this causes the balls to run into the shallow ends of their pockets 238, 239, thereby shifting the cam ring 236 a sufficient distance to release the clutch. The cam rings cannot have more rotative or separating motion occur therebetween than is shown in Figure 14, and hence the rotative braking action is effective for stopping the crank shaft 25. When the parts come to rest, the brake drum 81a continues to hold the shiftable clutch element in its disengaged position because the brake drum cannot shift laterally back toward the left until after the brake shoes have been released therefrom.

This modified embodiment is shown as provided with the clutch adjusting arrangement utilizing the threaded mounting sleeve 58 for adjustably shifting the flywheel 26 and driving clutch element 31 inwardly or outwardly along the shaft 25. If desired, this modified embodiment may also be provided with the clutch lockout mechanism 220 of Figures 1 and 11. The outer or right hand end of the sleeve extension 245 of non-shiftable cam ring 235 forms an abutment against which the internal shoulder 89 of the shiftable clutch member 34 strikes, thereby short circuiting the axial thrust of the servo struts and limiting the clutch engagement pressure as described in connection with the snap ring 88 of the previous embodiment.

In installations on certain types of punch presses and other one-cycle stop machines, or under certain operating conditions, it may be desirable or necessary to provide a continuously dragging brake band or other brake mechanism which will impose a relatively light continuous braking retardation on the shaft 25, in both embodiments of my invention. This continuously dragging brake band is an old and well known practice in punch presses, and, if required in any installations of my invention, it may conveniently be mounted upon the end of the crank shaft 25, opposite to that end which mounts my improved clutch and clutch control brake.

While I have illustrated and described what I regard to be the preferred embodiments of my invention, nevertheless it will be understood that such are merely exemplary and that numerous modifications and rearrangements may be made therein without departing from the essence of the invention.

I claim:

1. In clutch mechanism, the combination of a clutch comprising a shiftable clutch element, control means therefor comprising a rotatable and shiftable brake member operative to control said clutch by shifting movement, torque responsive servo mechanism operative to shift said shiftable clutch element toward said brake member, and rotatable thrusting mechanism operative to shift said brake member toward said shiftable clutch element.

2. In clutch mechanism, the combination of a clutch, a rotatable and shiftable brake member rotatable relatively to both the driving and driven elements of said clutch, and means for controlling said clutch by rotative interruption and axial shifting of said brake member, said controlling means comprising brake shoe means operative to hold said brake member against retrograde shifting movement after the clutch has been released.

3. In clutch mechanism, the combination of a clutch comprising a shiftable clutch element, operating mechanism therefor comprising a rotatable and shiftable brake member rotatable relatively to said shiftable clutch element but operative to impart shifting movement thereto, and control means for controlling said clutch through said rotatable and shiftable brake member comprising brake shoe means operative to hold said brake member in different shifted positions.

4. In clutch mechanism, the combination of a clutch comprising a shiftable clutch element, clutch operating mechanism comprising a brake drum adapted to rotate concentrically with said clutch and operative to shift axially upon having its rotative movements retarded relatively to said clutch, means for transmitting said shifting movement of said brake drum to said shiftable clutch element, and brake means operative to apply braking retardation to the rotary motion of said drum and to hold said drum in its shifted position after said rotary motion has been stopped.

5. In clutch mechanism, the combination of a clutch comprising driving and driven clutch elements, control means for said clutch comprising a single brake member rotatable relatively to said driven clutch element, and rotatable thrusting means for causing said brake member to shift toward said driven clutch element and to shift the latter into clutch releasing position when said brake member is retarded relatively to said clutch, whereby said brake member can perform the dual function of releasing said clutch and holding said driven clutch element against rotation.

6. In clutch mechanism, the combination of a clutch, a rotatable and shiftable brake member comprising a brake surface rotating concentrically of said clutch, means responsive to the engaging of said brake member for releasing said clutch and responsive to the releasing of said brake member for engaging said clutch, and brake shoe means for engaging said brake member and operative to hold said brake member against retrograde shifting movement after said clutch has been released.

7. In clutch mechanism, the combination of a clutch comprising a shiftable driven clutch element, control means for said clutch comprising a rotatable and axially shiftable brake drum having an annular brake surface rotating concentrically of said clutch, said brake drum performing the dual function of shifting said driven clutch element to clutch releasing position and thereafter holding said driven clutch element against rotation, and brake shoe means engaging with said annular brake surface and operative to hold said brake drum against retrograde shifting movement after the clutch has been released.

8. In a punch press or the like, the combination of a clutch for driving said press, a treadle, brake mechanism actuated by said treadle comprising a rotatable and shiftable brake drum having a brake surface rotating concentrically of said clutch, means responsive to the forward shifting motion of said brake drum for controlling said clutch, and brake shoe means coacting with said drum operative to hold said brake drum against backward shifting movement after the clutch has been released.

9. In clutch mechanism, the combination of a clutch, and control apparatus therefor comprising a rotatable and shiftable brake member, self-energizing brake means adapted to exert braking retardation against said brake member, and means responsive to such braking retardation for actuating said clutch causing said brake member to shift axially in one direction and thereby release said clutch, said brake means being operative to hold said brake member against return shifting movement in the opposite direction after the clutch has been released.

10. In combination, a clutch, a brake comprising a rotatable and shiftable brake member adapted to actuate said clutch, a first actuating means for releasing said brake, and a second actuating means for automatically engaging said brake independently of said first actuating means.

11. In combination, a clutch comprising a shiftable clutch element, brake mechanism comprising a rotatable and shiftable brake drum adapted to impart shifting movement to said shiftable clutch element for shifting the latter to clutch releasing position, brake shoe means coacting with said brake drum and operative to hold said brake drum against reverse shifting movement after release of the clutch, manually actuated starting means operative to release said brake shoe means for starting said clutch, and power actuated stopping means operative to engage said brake shoe means for stopping said clutch.

12. In combination, a clutch comprising a clutch element having actuating movement between clutch engaging and clutch releasing positions, actuating mechanism for effecting such movement comprising a rotatable and shiftable brake member, and control mechanism comprising manual actuating means adapted to operate through said brake member cause movement of said clutch element into one of said positions, power driven actuating means adapted to operate through said brake member to cause movement of said clutch element into the other of said positions, a motion transmitting member movable into and out of an operative position where it is effective to transmit motion from said power driven actuating means to said actuating mechanism, and selecting means for moving said motion transmitting member into and out of operative position.

13. In combination, a clutch comprising a shiftable clutch element, actuating mechanism for shifting said clutch element, power operated means receiving energy from the power transmitted to said clutch and adapted to control said actuating mechanism, motion transmitting means movable into and out of an operative position where it is effective to transmit motion from said power operated means to said actuating mechanism, means for holding said motion transmitting means in or out of said operative position, and manually operated means adapted to control said acuating mechanism independently of the transmission of motion through said motion transmitting means.

14. In clutch mechanism, the combination of a clutch comprising driving and driven clutch elements, one of which is shiftable, brake mechanism comprising a rotatable and shiftable brake drum for shifting said latter clutch element, brake shoe means coacting with said brake drum and operative to hold said brake drum against reverse shifting movement after the clutch has been released, manually actuated mechanism for releasing said brake shoe means, releasable detent means for holding said brake shoe means released, a cam rotating concurrently with said driven clutch element, a motion transmitter movable into and out of operative position where it is adapted to be engaged by said cam for transmitting tripping motion to said detent means, and means responsive to said manually actuated mechanism for moving said motion transmitter into and out of said operative position.

15. In clutch mechanism, the combination of a clutch comprising driving and driven clutch elements, one of which is shiftable, brake mechanism for shifting said latter clutch element comprising a rotatable and shiftable brake member and friction means adapted to engage therewith, manually actuated mechanism for releasing said brake mechanism, toggle means for holding said brake mechanism released, power actuated mechanism for tripping said toggle means comprising a cam rotating concurrently with said driven clutch element, a motion transmitter normally occupying an inoperative position where it is clear of said cam, but being movable into an operative position where it is adapted to be engaged by said cam, said motion transmitter serving to transmit tripping motion to said toggle means, a single-trip controller responsive to said manually actuated mechanism and adapted to have motion in different paths, in one of which said controller displaces said motion transmitter from said inoperative position to said operative position, and selector means for selectively governing the path of motion of said single-trip controller.

16. In clutch mechanism, the combination of a clutch, actuating mechanism for said clutch comprising a brake, and control mechanism for said brake comprising a manually operated member, a brake actuating member, said members having coacting shoulders adapted to transmit motion from said manually operated member to said brake actuating member, and deflecting means for causing said manually operated member to be deflected out of one path of movement for separating said shoulders and to be restored to normal position through another path of movement.

17. In clutch mechanism, the combination of a clutch, control mechanism for controlling said clutch comprising a brake and a brake actuator, and toggle mechanism for holding said brake actuator in one position, said toggle mechanism comprising a pair of jack-knife toggle links, a stationary supporting pivot supporting one of said links, a movable supporting pivot supporting the other link, a knuckle pivot connecting said links and movable into and out of dead-center alignment with said supporting pivots, and a biasing spring connected to said links at points spaced laterally from said supporting pivots.

18. In clutch mechanism, the combination of a clutch comprising driving and driven clutch elements, actuating mechanism for said clutch comprising a rotatable brake member rotating with the driven clutch element and adapted by shifting movement to release said clutch, and control mechanism comprising safety stop means operative to first exert a shifting force on said rotatable brake member to release the clutch, and to thereafter positively block continued rotation of said rotatable brake member and driven clutch element.

19. In clutch mechanism for driving a punch press or the like, the combination of a clutch, a rotatable and shiftable brake drum operatively connected to control said clutch, a brake shoe adapted to engage said brake drum, a foot treadle, control apparatus responsive to said treadle for controlling said brake shoe to cause single-trip operation or repeating operation of the punch press, and a supporting plate mounting said brake shoe and said control apparatus substantially as a unit assembly on the frame of said punch press.

20. In clutch mechanism, the combination of a clutch comprising driving and driven clutch elements, one of which is shiftable, inner and outer helically splined rotatable members, one of said splined members rotating with said driven clutch element and the other of said splined members being shiftable and being operative to shift said shiftable clutch element, a brake drum rotatable relatively to and concentrically of said driven clutch element and connected with said shiftable splined member to rotate and shift therewith, and brake shoe means for exerting braking retardation against said brake drum to cause said shiftable splined member to shift and release said clutch, said brake shoe means being operative to lock said brake drum against rotary and shifting movements after the clutch has been released.

21. In clutch mechanism, the combination of a clutch comprising driving and driven clutch elements, one of which is shiftable, ball-cam thrusting mechanism comprising two cam rings having inclined pockets therein and balls in said pockets, one of said cam rings rotating with said driven clutch elements and the other of said cam rings being shiftable and being operative to shift said shiftable clutch element, a brake drum connected with said shiftable cam ring to rotate and shift therewith, and brake shoe means for exerting braking retardation against said brake drum to cause said shiftable cam ring to shift and release said clutch, said brake shoe means being operative to lock said brake drum against rotary and shifting movements after the clutch has been released.

22. In combination, a driving member, a driven member, a clutch for operatively connecting these two members together, load responsive servo mechanism transmitting engaging pressure to said clutch, a brake for the driven member, said brake comprising a shiftable brake member adapted to transmit releasing pressure to said clutch in opposition to said load responsive servo mechanism, and means whereby engaging the brake releases the clutch and releasing the brake engages the clutch.

23. In clutch mechanism, the combination of a clutch comprising driving and driven clutch elements, one of which is shiftable, torque responsive servo mechanism operative to exert shifting force against said shiftable clutch element in a direction to increase the pressure of clutch engagement, clutch releasing shifter mechanism operative to exert shifting force against said shiftable clutch element in the opposite direction to release the clutch, and stop means separate from said clutch releasing shifter mechanism for limiting the clutch engaging pressure which said servo mechanism can impose on said clutch elements.

24. In clutch mechanism, the combination of a clutch comprising driving and driven clutch elements one of which is shiftable, a shaft, a rotary thrust reaction member on said shaft, torque responsive servo mechanism for exerting shifting force against said shiftable clutch element in a clutch engaging direction, said servo mechanism reacting against said reaction member, and clutch releasing shifter mechanism for exerting shifting force against said shiftable clutch element in a clutch releasing direction, said clutch releasing mechanism also reacting against said reaction member.

25. In clutch mechanism, the combination of a clutch, a brake for controlling said clutch comprising a rotatable and shiftable brake drum adapted to have a predetermined rotative freedom relatively to said clutch, means for causing said clutch to engage when said brake is released and for causing said clutch to release when said brake is engaged, and means operative to restrict said predetermined rotative freedom between said brake drum and said clutch for holding said clutch released when said brake is released.

26. In clutch mechanism, the combination of a friction clutch, a friction brake for controlling said clutch comprising a rotatable and shiftable brake drum normally having a predetermined degree of rotative freedom relatively to said clutch, control means operative during the normal functioning of said mechanism to cause said clutch to engage when said brake is released and to cause said clutch to release when said brake is engaged, and clutch lockout means comprising cooperating members carried by said clutch and by said brake drum and operative to restrict said predetermined degree of rotative freedom for holding said clutch in released position while said brake is also released.

27. In a friction clutch, the combination of a shaft, a flywheel rotatably mounted on said shaft, a first clutch element connected with said shaft, a cooperating second clutch element connected with said flywheel, a sleeve revolving freely on said shaft and rotatable relatively to said flywheel, and coacting threads on said flywheel and on said sleeve whereby rotation of said sleeve serves to axially shift said flywheel and said second clutch element relatively to said first clutch element.

28. In a friction cone clutch, the combination of a shaft, a flywheel rotatably mounted on said shaft, a driving cone carried by said flywheel, a driven cone carried by said shaft and adapted to be shifted into and out of clutching engagement with said driving cone, torque responsive servo mechanism operative between said driven cone and said shaft for augmenting the pressure of engagement between said cones, stop means for limiting the pressure of engagement between said cones, an adjusting sleeve mounted in non-shifting relation on said shaft and rotatable relatively to said flywheel, coacting threads on said flywheel and on said adjusting sleeve whereby rotation of said adjusting sleeve relatively to said flywheel serves to axially adjust said driving cone relatively to said driven cone, and means for locking said flywheel and adjusting sleeve together after making such adjustment.

29. In clutch mechanism, the combination of a shaft, a flywheel on said shaft, a driving cone carried by said flywheel, a driven cone carried by said shaft and adapted to be shifted into and out of clutching engagement with said driving cone, torque responsive servo mechanism operative between said driven cone and said shaft for augmenting the pressure of engagement between said cones, brake mechanism for controlling the operation of said clutch, and means for adjusting said clutch by shifting said flywheel and driving cone axially along said shaft relatively to said driven cone.

30. In clutch mechanism, the combination of a driven shaft, a clutch for driving said shaft comprising a shiftable clutch element, a rotatable and shiftable brake member adapted to impart shifting movement to said shiftable clutch element, said brake member and said shiftable clutch element being capable of relative rotation, rotary thrusting mechanism of the inclined plane type coacting between said driven shaft and said shiftable brake member whereby braking retardation exerted on said brake member relatively to rotation of said driven shaft causes said brake member to shift axially in a clutch releasing direction, said shiftable clutch element shifting directly with said brake member in such clutch releasing direction, and brake shoe means coacting with said brake member and capable of holding said brake member against retrograde shifting motion after the clutch has been released.

CLARENCE M. EASON.